(12) United States Patent
Garcia

(10) Patent No.: US 10,834,267 B2
(45) Date of Patent: Nov. 10, 2020

(54) TIME-BASED NANO-TRANSACTION SYSTEM FOR REDUCING UNSOLICITED COMMUNICATIONS

(71) Applicant: RoboCash, Inc., Irvine, CA (US)

(72) Inventor: Adrian Espinoza Garcia, Irvine, CA (US)

(73) Assignee: ROBOCASH, INC., Irvine, CA (US)

( * ) Notice: Subject to any disclaimer, the term of this patent is extended or adjusted under 35 U.S.C. 154(b) by 0 days.

(21) Appl. No.: 16/820,313

(22) Filed: Mar. 16, 2020

(65) Prior Publication Data

US 2020/0304647 A1 Sep. 24, 2020

Related U.S. Application Data

(60) Provisional application No. 62/842,736, filed on May 3, 2019, provisional application No. 62/820,245, filed on Mar. 18, 2019.

(51) Int. Cl.
*H04M 15/00* (2006.01)
*H04M 3/42* (2006.01)
(Continued)

(52) U.S. Cl.
CPC ........ *H04M 15/8207* (2013.01); *G06Q 20/16* (2013.01); *G06Q 20/29* (2013.01);
(Continued)

(58) Field of Classification Search
CPC .. H04M 3/42059; H04M 3/436; H04M 15/43; H04M 15/8207; H04M 15/735;
(Continued)

(56) References Cited

U.S. PATENT DOCUMENTS 5,381,467 A * 1/1995 Rosinski ............... H04M 15/00
 379/111
6,353,663 B1 * 3/2002 Stevens ................. H04M 15/00
 379/111

(Continued)

OTHER PUBLICATIONS

Rosenberg, J., Jennings, C.; "The Session Initiation Protocol (SIP) and Spam"; The Internet Society; Jul. 11, 2004.

(Continued)

*Primary Examiner* — Binh Kien Tieu
(74) *Attorney, Agent, or Firm* — Stetina Brunda Garred & Brucker; Peter Jon Gluck

(57) ABSTRACT

A telecommunications system for selectively connecting originator nodes to recipient nodes includes an account database with one or more accounts each associated with corresponding ones of the originator nodes and the recipient nodes. There is a contacts database with recipient contact lists each associated with a specific one of the accounts of the recipient nodes. A transaction processor is receptive to an incoming telecommunications initiation request, which includes a recipient node identifier and a nano-transaction payment submission defined at least by a payment amount. The transaction processor responsively directs the establishment of the telecommunications link between the one of the originator nodes and the one of the recipient nodes upon receipt of the telecommunications initiation request. The nano-transaction payment submission is settled based at least in part upon an active duration of the telecommunications link.

24 Claims, 9 Drawing Sheets

(51) Int. Cl.
*H04M 3/436* (2006.01)
*G06Q 20/22* (2012.01)
*G06Q 20/16* (2012.01)
*G06Q 40/00* (2012.01)
*G06Q 20/40* (2012.01)
*G06Q 40/02* (2012.01)

(52) U.S. Cl.
CPC ......... *G06Q 20/407* (2013.01); *G06Q 40/02* (2013.01); *G06Q 40/12* (2013.12); *H04M 15/735* (2013.01); *H04M 3/42059* (2013.01); *H04M 3/436* (2013.01)

(58) Field of Classification Search
CPC ...... G06Q 10/107; G06Q 20/14; G06Q 20/16; G06Q 20/29; G06Q 30/0273; G06Q 40/02; G06Q 40/12; H04L 51/12; G06F 15/16
USPC .................... 379/114.01, 142.01, 114.05
See application file for complete search history.

(56) References Cited

U.S. PATENT DOCUMENTS

| | | | | |
|---|---|---|---|---|
| 6,373,931 | B1* | 4/2002 | Amin | H04M 15/00 379/112.01 |
| 6,430,279 | B2* | 8/2002 | Sawatzki | H04M 15/00 379/112.01 |
| 6,483,910 | B1* | 11/2002 | Council | H04M 15/00 379/114.1 |
| 6,650,742 | B1* | 11/2003 | Elliott | H04M 15/06 379/114.05 |
| 6,697,462 | B2* | 2/2004 | Raymond | G06Q 10/107 379/100.09 |
| 6,977,996 | B1* | 12/2005 | Brothers | H04M 15/08 379/114.05 |
| 7,379,972 | B2 | 5/2008 | Landesmann et al. | |
| 8,429,232 | B1 | 4/2013 | Appenzeller et al. | |
| 2001/0023432 | A1* | 9/2001 | Council | H04L 51/12 709/206 |
| 2002/0015483 | A1* | 2/2002 | Gruchala | H04M 15/745 379/127.01 |
| 2002/0099670 | A1* | 7/2002 | Jakobsson | G06Q 30/02 705/400 |
| 2004/0165707 | A1* | 8/2004 | Raymond | H04L 12/14 379/93.02 |
| 2005/0144244 | A1* | 6/2005 | Landesmann | H04L 51/12 709/206 |
| 2006/0026107 | A1* | 2/2006 | Urro | G06Q 20/367 705/65 |
| 2006/0093111 | A1* | 5/2006 | Peck | G06Q 30/04 379/114.13 |
| 2009/0116628 | A1* | 5/2009 | Ropolyi | H04M 15/46 379/114.22 |
| 2014/0254781 | A1* | 9/2014 | Kline | H04M 3/436 379/114.03 |
| 2015/0154577 | A1* | 6/2015 | Gargash | G06Q 20/14 705/40 |
| 2015/0356630 | A1* | 12/2015 | Hussain | G06Q 10/107 705/14.69 |

OTHER PUBLICATIONS

Marias, G.F., Dritsas, S., Theoharidou,; M., Mallios, J., Gritzalis, D.; "SIP Vulnerabilities and Anti-SPIT Mechanisms Assessment"; IIEEE; 2007.
Rosenberg, J., Jennings, C.; "The Session Initiation Protocol (SIP) and Spam"; Network Working Group; Jan. 2008.
Rebahi, Yacine, Sisalem, Dorgham, Magedanz, Thomas; "SIP Spam Detection"; IIEEE; 2006.

* cited by examiner

TIME-BASED NANO-TRANSACTION SYSTEM FOR REDUCING UNSOLICITED COMMUNICATIONS

CROSS-REFERENCE TO RELATED APPLICATIONS

This application relates to and claims the benefit of U.S. Provisional Application No. 62/820,245 filed Mar. 18, 2019 and entitled "Time-Based Refundable Microtransactions as an Anti-Spam Method," and U.S. Provisional Application No. 62/842,736 filed May 3, 2019 and entitled "Time-Based Refundable Nano-Transactions as an Anti-Spam Method," the entire disclosures of which are wholly incorporated by reference herein.

STATEMENT RE: FEDERALLY SPONSORED RESEARCH/DEVELOPMENT

Not Applicable

BACKGROUND

1. Technical Field

The present disclosure relates generally to telecommunications, and more particularly to time-based nano-transaction systems for reducing unsolicited communications.

2. Related Art

Telephone users, whether landline or mobile, are regularly flooded with unwanted calls initiated en masse with automated dialers. By some recent estimates, over 54 billion unsolicited telephone calls were received in the United States in the course of a year. Pre-recorded messages of commercial or political nature are typically delivered once the call is connected, and because of its automated nature, such calls are referred to as robocalls. There may be valuable emergency or public service messages that may be delivered via robocalls, and even legitimate, though unwelcome business/commercial solicitations may be made. However, an increasing number of robocalls are fraudulent or are outright scams, such as where the caller poses as a revenue agent and threatens criminal sanctions against the call recipient. Although caller identification technology allows telephone users to identify the caller before the call is connected, it is possible to spoof the number, thereby tricking the recipient into answering the call. Oftentimes, the area code and prefix are set to those of the called number to make the call appear as though it is coming from a neighbor. The volume of unwanted calls has become so high that most users simply do not answer incoming calls from unknown numbers and/or allow the call to go to voicemail.

There have been a number of legislative efforts to illegalize robocalls and other unsolicited calls. Earlier efforts include "do-not-call" lists in which the telephone user specifically opted out of receiving unsolicited calls. Telemarketers are required to honor those requesting not to be called, though only legitimate organizations complied with the law. Again, with most of the robocalls being made today being fraudulent, scam callers tend not to be dissuaded with the violation of another law.

More recently, technological solutions implemented at the mobile device end have sought to curtail unwanted calls. Applications installed on smart phones can enforce whitelists and blacklists, allowing only calls coming in from telephone numbers that have been specifically designated as safe in the whitelist, or disallowing all calls coming in from telephone numbers in the blacklist. The addition of entries into the whitelists and blacklists may be extended beyond the immediate user of the telephone and may be crowd-sourced. Other users receiving unsolicited phone calls from a phone number can designate it as such in a central database, which may then be used by the mobile device of other users to block the incoming call.

The technology to make automated telephone calls is relatively inexpensive, and anti-spam or robocall circumvention techniques tend to be one step ahead. There is a continued incentive to continue abusive telephone calling practices, as there may be a few unsuspecting people that may be unwittingly duped. Accordingly, unless the economic fundamentals are addressed, the volume of unwanted robocalls and other unsolicited telecommunications is likely to increase.

Payment-based unsolicited communications reduction strategies have been proposed, such as in the Internet Engineering Task Force (IETF) Internet-Draft working document entitled "The Session Initiation Protocol (SIP) and Spam" by J. Rosenberg and C. Jennings. First contemplated in the e-mail context, a "payment at risk" strategy involves the receiving party taking two steps: first, ending the call, then second, deciding whether the sending party is a spam communication. Prior to placing the call, the initiating party deposits a small amount of money into the receiving party's account. If the receiving party decides that the call is not spam, then the money is refunded. If it is decided that the call is spam, then the receiving party keeps the money. In the e-mail context, deposit-contingent sending rights are described in, for example, U.S. Pat. No. 7,379,972, the disclosure of which is hereby incorporated by reference in its entirety.

An improvement to the aforementioned technique is disclosed in "SIP Spam Detection," by Rebahi, Y., Sisalem, D., and Magedanz, T. published in International Conference on Digital Communications, (ICDT'06) 68-68 (IEEE 2006), which describes the use of a central server and implementing financial microtransactions to reduce spam over internet telephony (SPIT). In addition, a reputation-based method is used to further identify unsolicited messages and calls. Another improvement as disclosed in "SIP Vulnerabilities and Anti-SPIT Mechanisms Assessment" by Marias, G. F., Dritsas, S., Theoharidou, M., Mallios, J., and Grizalis, D., published in 2007 16th International Conference on Computer Communications and Networks 597-605 (IEEE 2007) contemplates the use of a central server to authenticate the sending party after a microtransaction payment has been received by the server. Along these lines, the use of signatures and other authentication measures is disclosed in U.S. Pat. No. 8,429,232, which is wholly incorporated by reference in its entirety herein. In general, however, the use of nano-transactions especially in the context of preventing unsolicited telecommunications has been disfavored because of the lack of suitable platforms and attendant maintenance costs.

Accordingly, there is a need in the art for an improved anti-spam system that addresses the underlying economic incentives for unsolicited and unwanted communications. There is also a need in the art for a nano-payment system that is fee-free, have near instant settlement time, a lightweight implementation, and is scalable for use in connection with the anti-spam system.

BRIEF SUMMARY

The present disclosure contemplates the addition of a payment layer on to telecommunications architectures. An originator node interacts with a central server to initiate a phone call to a recipient node that is registered with the central server. If the originator node is not on the contact list of the recipient node, then the central server acts on behalf of the recipient to reject the incoming call by sending it to voicemail, or otherwise rejecting the call. In order to bypass this blind filter, the central server processes a refundable nano-transaction payment and an identifier for the recipient node. The refundable nano-transaction payment thus serves as a deposit. Upon receiving indication that the nano-transaction payment was made, the phone call is allowed to proceed as normal, with the central server acting as a time-based escrow between the originator node and the recipient node. Once the recipient party answers the nano-transaction payment-backed call, if the duration of the call is longer than a predefined threshold, the central server refunds the originator's payment. On the other hand, if the call lasts less than the threshold duration, the central server keeps the nano-transaction payment and distributes a portion to the inconvenienced recipient node. This is envisioned to create an environment where entities that abuse the phone network with a high volume of calls suffer financial loss by losing the refunds from the nano-transaction payments. Bad actors with aggressive robo-dialers are thus financially punished in accordance with the embodiments of the present disclosure.

According to a one embodiment, there is a telecommunications system for selectively connecting originator nodes to recipient nodes. The system may include an account database with one or more accounts each associated with corresponding ones of the originator nodes and the recipient nodes. There may also be a contacts database with recipient contact lists each associated with a specific one of the accounts of the recipient nodes. The recipient contact lists may each include one or more known contacts. The system may also include a transaction processor that is receptive to an incoming telecommunications initiation request from one of the originator nodes to one of the recipient nodes. The telecommunications initiation request may include a recipient node identifier and a nano-transaction payment submission defined at least by a payment amount and. The transaction processor may responsively direct the establishment of the telecommunications link between the one of the originator nodes and the one of the recipient nodes upon receipt of the telecommunications initiation request. This may also be based on an evaluation of the one of the originator nodes being absent from the recipient contact list in the account associated with the one of the recipient nodes. The nano-transaction payment submission may be settled based at least in part upon an active duration of the telecommunications link.

Another embodiment of the present disclosure may be a method for selectively connecting an originator node to a recipient node over a telecommunications link. The method may include receiving an incoming telecommunications initiation request on a central server. The telecommunications initiation request may include a recipient node identifier and a nano-transaction payment submission defined at least by a payment amount and. There may also be a step of storing the nano-transaction payment submission in a processor ledger on the central server. Furthermore, there may be a step of directing the establishment of the telecommunications link from the originator node to the recipient node upon storing the nano-transaction payment submission. Then, there may be a step of initiating a connection timer once the telecommunications link between the originator node and the recipient node is established. The method may also include settling the nano-transaction payment submission based upon an evaluation of a connection duration as measured by the connection timer from the establishment of the telecommunications link between the originator node and the recipient node. This method may also be embodied as one or more programs of instruction executable by the central server and stored in a non-transitory program storage medium readable by the same.

Prior to the instant teachings, use of "spam" or Anti-Spam was subject to limitations which the systems and methods of the present disclosure have overcome. The present disclosure will be best understood accompanying by reference to the following detailed description when read in conjunction with the drawings. Skilled artisans will appreciate that features in the figures are illustrated for simplicity and clarity. Also, common but well-understood elements that are useful or necessary in a commercially feasible embodiment are often not depicted in order to facilitate a less obstructed view of these various embodiments of the present disclosure.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of systems and methods for reducing unsolicited real-time communications (spam). It is not intended to represent the only form in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
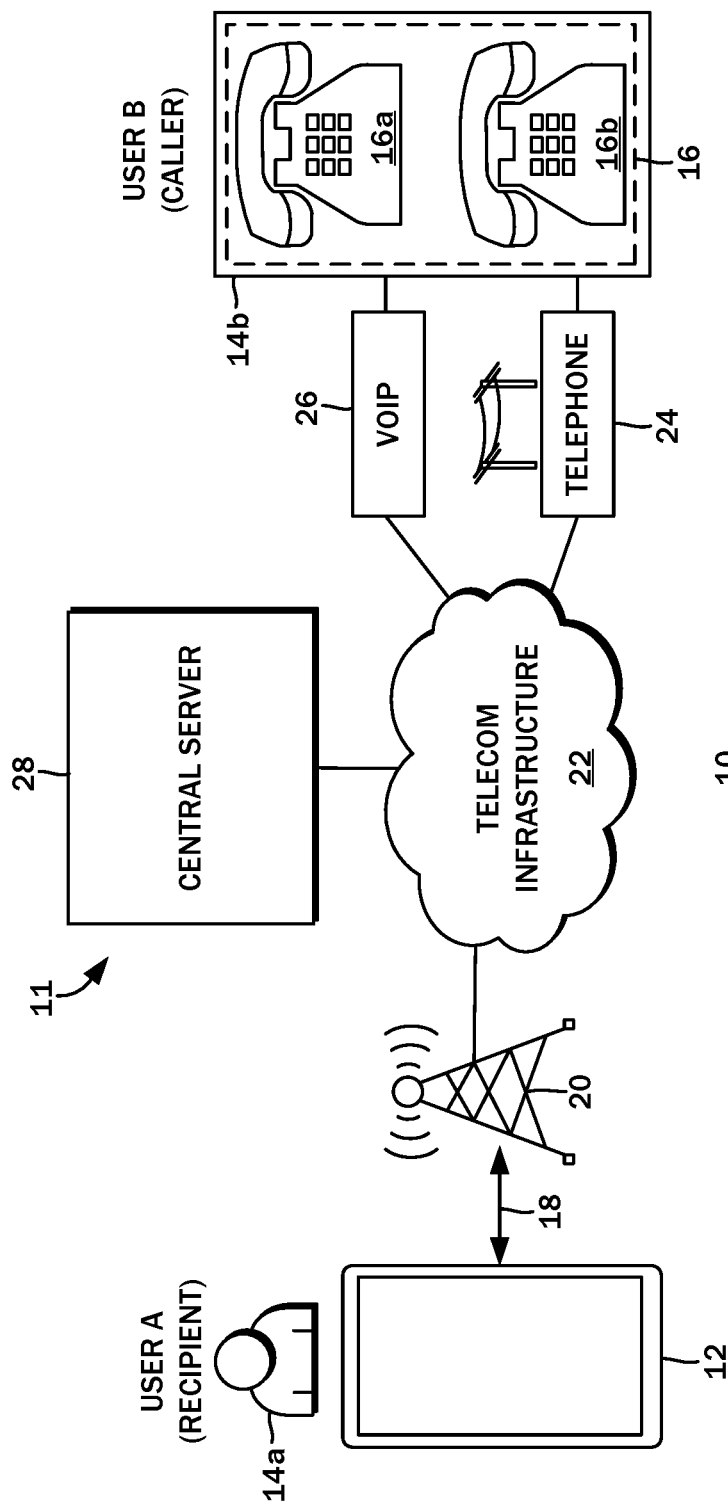
FIG. 1 is a block diagram illustrating an exemplary telecommunications environment in which various embodiments of the present disclosure may be implemented.

The present disclosure contemplates the adding of a payment layer on to telecommunications architectures in order to discourage and limit abuse. With reference to the block diagram of FIG. 1, one such telecommunications architecture is a public switched telephone network 10. By way of example, a mobile device 12 owned and used by a first user 14a may be part of the network 10, along with an auto-dialing telephone bank 16 comprised of multiple telephone devices 16a, 16b owned and operated by an organization 14b to reach as many people as possible. Although telemarketing is used by legitimate enterprises to for lead generation, sales, polling, and so forth, it is also used by criminals to conduct fraudulent activities and scams. The organization 14b may therefore be either and are referenced broadly and interchangeably because unsolicited calls therefrom are generally unwanted. The methods and systems of the present disclosure are envisioned to reduce the incidence of these types of phone calls.

In further detail, the mobile device 12 may be a smartphone that fills a variety of roles in addition to voice communications, including text communications (Short Message Service, e-mail, Internet-based instant messaging, etc.), calendaring, task lists, along with typical Internet-based functionality such as web browsing, online shopping and banking, and social networking. With the integration of additional hardware components, the mobile device 12 may be used for photography, navigation and mapping, and cashless payments with point-of sale terminals, and so on. Smartphones have seen widespread adoption in part due to the convenient accessibility of these functions and more from a single portable device that can always be within reach of the user. At its foundation, however, the smartphone is still a phone, and its user can and are frequently interrupted by incoming phone calls.

The mobile device 12 includes a general-purpose data processor that executes pre-programmed instructions, along with wireless communication modules by which data is transmitted and received. The processor further cooperates with multiple input/output devices, including combination touch input display screens, audio components such as speakers, microphones, and related integrated circuits, Global Positioning System receivers, and physical buttons/input modalities. More recent devices also include accelerometers and compasses that can sense motion and direction. For portability purposes, all of these components are powered by an on-board battery. Management of these hardware components is performed by a mobile operating system, also referenced in the art as a mobile platform. The mobile operating system provides several fundamental software modules and a common input/output interface that can be used by separate first party as well as third party applications via application programming interfaces.

Several distance and speed-dependent communication protocols may be implemented on the mobile device 12. These include high speed local area networking modalities such as WiFi, as well as close range device-to-device data communication modalities such as Bluetooth. Additionally, there may be longer range cellular network modalities such as GSM (Global System for Mobile communications), 4G LTE (Long Term Evolution), EDGE (Enhanced Data rates for GSM Evolution), UMTS (Universal Mobile Telecommunications System), and so forth, which are used to establish a wireless communications link 18 to a cellular network 20. The network 10 may include other network segments implemented with different technologies to connect other devices, but these are generally referred to as a telecommunications infrastructure 22.

More particularly with regard to the telephone bank 16 and the telephone devices 16a, 16b, there are likewise a variety of modalities for connecting the same to the telecommunications infrastructure 22 that ultimately links to the call recipient, e.g., the user 14a and the mobile device 12 used thereby. One modality is a conventional wired switched telephone network 24. Increasingly common are Voice Over IP (VoIP) modalities, which utilize the Internet to carry data corresponding to the audio of the phone call. There may be a VoIP system 26 that is connected to the telecommunications infrastructure 22. The telephone bank 16 may include one or more computer systems that sequentially dial telephone numbers in an effort to reach someone, e.g., the user 14a. The request to initiate the call may be made to the service provider of the VoIP system 26, which routes the request through the telecommunications infrastructure 22, then to the cellular network 20, and to the mobile device 12. The user 14a is alerted of the incoming call, and the connection is established upon accepting the same by some action. Upon a call connection being established, the telephone bank 16 may transfer the line to a live operator. A similar process is understood to be employed when utilizing the conventional wired switched telephone network 24. The illustration of the conventional wired switched telephone network 24 and the VoIP system 26 is presented by of example only and not by limitation, and other network communications modalities may be readily substituted without departing from the present disclosure.

Although the public switched telephone network 10 has been described and the system 11 for reducing unsolicited communications is described in the context thereof, this is understood to be by way of example only. The system may be adapted to other real-time communications systems that may be subject to abuse by telemarketers or fraudsters and burden its users with unsolicited and unwanted communication requests. Still referring to the block diagram of FIG. 1, the system may be embodied in a central server 28 that is either a part of the telecommunications infrastructure 22, or at least cooperates with the telecommunications infrastructure 22 to reduce the financial incentive for the organization 14b to continue its abusive practices in mass-dialing the user 14a and others. One contemplated way this may be achieved is a nano-transaction payment platform that requires the organization 14b to deposit funds into an account associated with the user 14a prior to establishing the call. The present disclosure refers to nano-transactions, though this may be interchangeable with the more common term of microtransactions.

Figure 2:
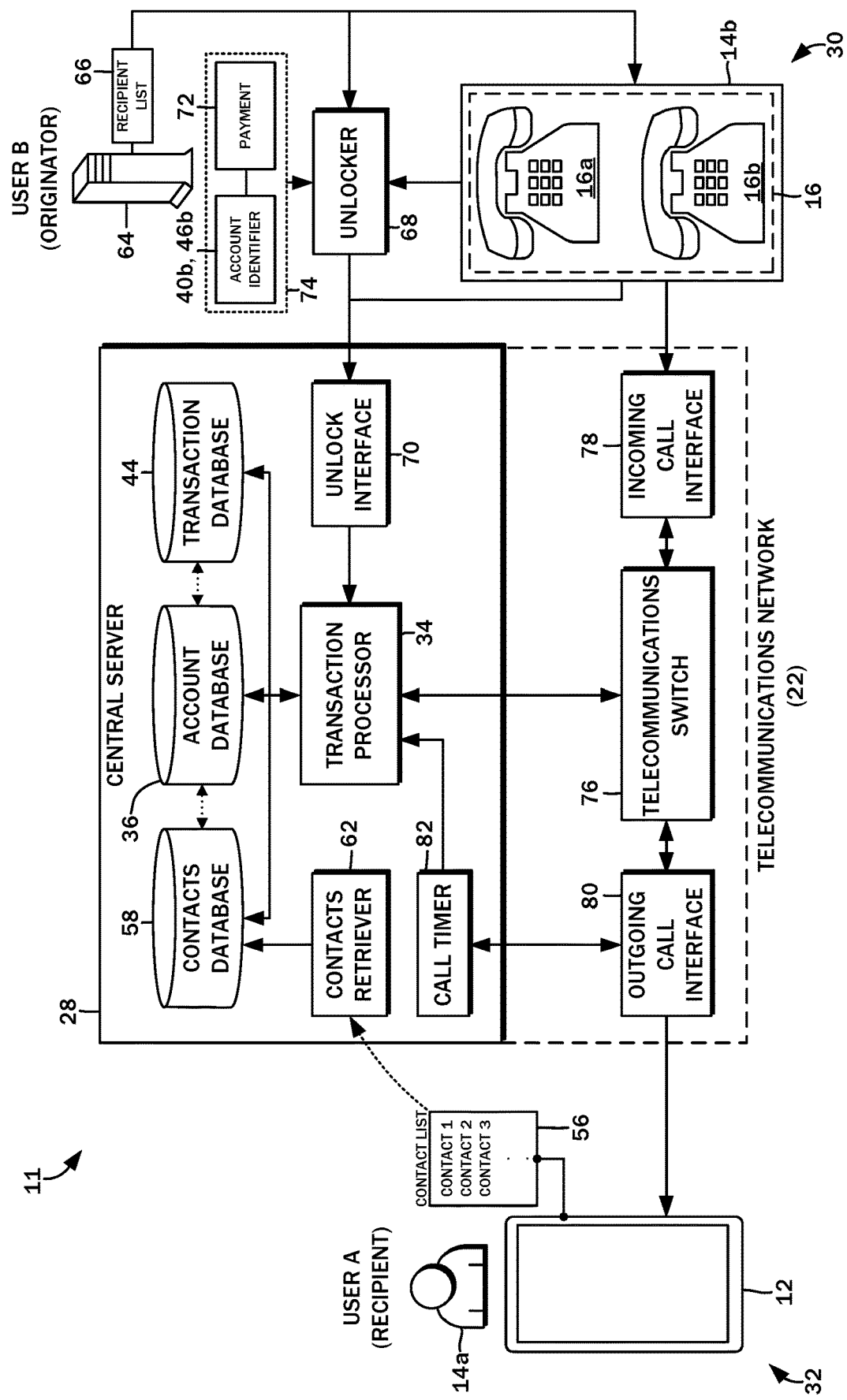
FIG. 2 is a detailed block diagram of one embodiment of a telecommunications system for selectively connecting originator nodes to recipient nodes.

Additional details of one possible embodiment of the central server 28 are shown in the block diagram of FIG. 2. It is understood that the central server 28 can be one or more standalone computer systems with general purpose data processors, memory, input/output modalities, and secondary storage. A processor may be provided by one or more processors including, for example, one or more of a single core or multi-core processor (e.g., AMD Phenom II X2, Intel Core Duo, AMD Phenom II X4, Intel Core i5, Intel Core I & Extreme Edition 980X, or Intel Xeon E7-2820). An I/O modality may include a video display unit (e.g., a liquid crystal display (LCD) or a cathode ray tube (CRT)), an alphanumeric input device (e.g., a keyboard), a cursor control device (e.g., a mouse), a disk drive unit, a signal generation device (e.g., a speaker), an accelerometer, a microphone, a cellular radio frequency antenna, and a network interface device (e.g., a network interface card (NIC), Wi-Fi card, cellular modem, data jack, Ethernet port, modem jack, HDMI port, mini-HDMI port, USB port), touchscreen (e.g., CRT, LCD, LED, AMOLED, Super AMOLED), pointing device, trackpad, light (e.g., LED), light/image projection device, or a combination thereof. Memory refers to a non-transitory memory which is provided by one or more tangible devices which preferably include one or more machine-readable medium on which is stored one or more sets of instructions (e.g., software) embodying any one or more of the methodologies or functions described herein. The software may also reside, completely or at least partially, within the main memory, processor, or both during execution thereof by a computer within system, the main memory and the processor also constituting machine-readable media. The software may further be transmitted or received over a network via the network interface device.

While the machine-readable medium can in an exemplary embodiment be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Memory may be, for example, one or more of a hard disk drive, solid state drive (SSD), an optical disc, flash memory, zip disk, tape drive, "cloud" storage location, or a combination thereof. In certain embodiments, a device of the present disclosure includes a tangible, non-transitory computer readable medium for memory. Exemplary devices for use as memory include semiconductor memory devices, (e.g., EPROM, EEPROM, solid state drive (SSD), and flash memory devices e.g., SD, micro SD, SDXC, SDIO, SDHC cards); magnetic disks, (e.g., internal hard disks or removable disks); and optical disks (e.g., CD and DVD disks).

Generally, the organization 14b and the telephones 16 that originates the telephone calls may be referred to as an originator node 30, while the user 14a and the mobile device 12 may be referred to as a recipient node 32. The central server 28 is understood to serve as a blind filter and an intermediary between the originator node 30 and the recipient node 32, so that only those calls initiated by the originator node 30 that the recipient node 32 wanted to take are connected without consequence to the originator node 30. To the extent the placed call is not wanted by the recipient node 32, it is assured of at least a de minimis compensation as an incentive to accept the call, while the originator node 30 is disincentivized to not make calls that are likely to have a direct per-call associated cost.

The central server 28 does not attempt to discern what is an unsolicited call (e.g., spam) versus what is not. Again, acting as a blind filter, all incoming communications from unknown originator nodes 30 is refused unless that communications is accompanied by a refundable nano-transaction that is payable to the recipient node 32. The central server 28 may include a transaction processor 34 that handles the placing and refusing of the calls, along with the transfer of nano-transaction payments to and from the originator node 30 and the recipient node 32.

Figure 3:
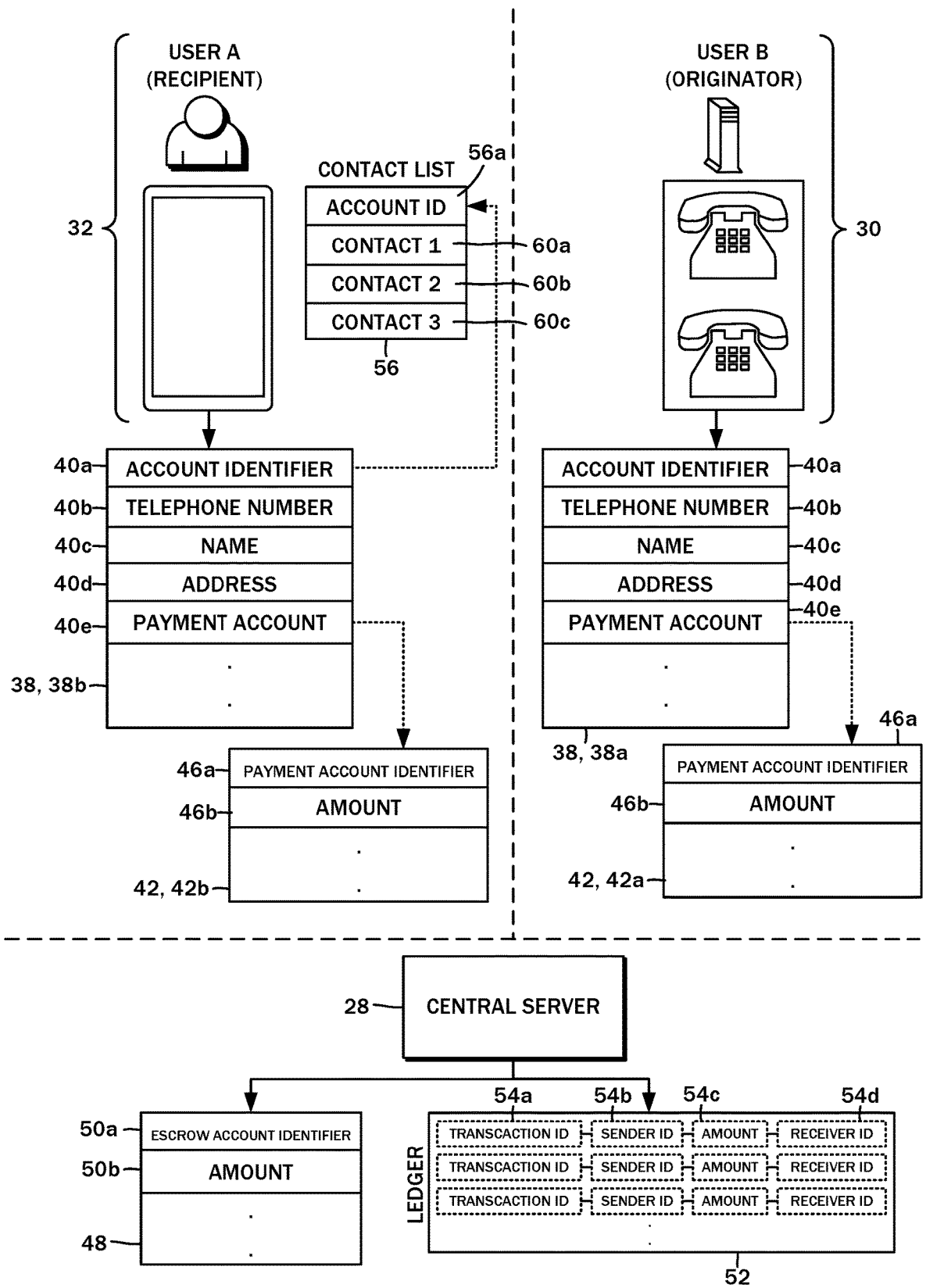
FIG. 3 is a diagram illustrating the data sets associated with a central server, an originator node, and a recipient node in accordance with the embodiments of the present disclosure.

The transaction processor 34 utilizes a variety of data sources to implement this functionality. In one embodiment of the central server 28, there may be an account database 36 that stores information about each of the nodes that utilize or are a part of the system 11. Referring now to the diagram of FIG. 3, the originator node 30 has associated therewith an originator account 38a, and the recipient node 32 has associated therewith a recipient account 38b. These records may be stored on the account database 36. Both the originator account 38a and the recipient account 38b may be referred to more generally as an account 38 having the same fields. In particular, there may be a field for an account identifier 40a that uniquely identifies the node within the system 11. There may also be a field for a telephone number 40b, though because a full telephone number is understood to be unique in the public switched telephone network 10, the telephone number 40b and the account identifier 40a may be the same. Additionally, the account 38 may include a name field 40c to store the name of the owner of the account. Other identifying information such as the owner's address may be stored in an address field 40d. Though not shown, demographic/identifying information such as birthdate, gender, and so on may also be stored in the account 38.

One of the functions of the central server 28 is to facilitate nano-transactions between different accounts of the system 11, and so each account 38 is associated with a corresponding payment account 42. In further detail, the originator account 38a is associated with an originator payment account 42a, while the recipient account 38b is associated with a recipient payment account 42b. The originator payment account 42a and the recipient payment account 42b may be referred to more generally as payment accounts 42.

In a preferred implementation, the payment accounts 42 may be associated with and maintained by an independent nano-transaction payment platform, such as a fee-less distributed cryptocurrency system. One example is the Nano platform (nano.org) that employs a directed acyclic graphs model with a open representative voting consensus model for ledger validation. This platform is understood to have fast response times typically in the range of 1 to 5 seconds, does not require a fee for use, and capable of transferring micro/nano-level values. One advantage of employing an external payment platform is that each node may control their funds independently of the central server 28. The use of this payment platform or other cryptocurrency platforms is by way of example only and not of limitation, and any other payment modality capable of transferring any amounts whether small or large may be substituted. It is also possible to maintain a credit system within the confines of the system 11 rather than using an external payment platform, which may eliminate the need for a central wallet.

A payment account field 40e in the account record 40 may reference the specific payment account 42 (whether internal or external), which is also referenced with a field for a payment account identifier 46a. In general terms, the payment account 42 is understood to also include at least a field for a funds amount 46b, which records amount of money or other credit that is stored therefor. The association between a given account record 40 and its payment account 42 is understood to be made at the time the user registers with the central server 28. A preferred though optional embodiment utilizes fiat currency, e.g., United States dollars, though this is by way of example only and not of limitation. Any other currency, monetary system (either digital or physical), credit, token, or other asset with value may be substituted without departing from the present disclosure.

The embodiments of the present disclosure also contemplate the system 11, or more specifically the central server 28, acting as a time-based escrow between the originator node 30 and the recipient node 32. In this regard, the central server 28 may have associated therewith an escrow account 48 on the payment platform similar to the payment accounts 42 associated with the originator node 30 and the recipient nodes 32. The escrow account 48 may have an escrow account identifier 50a, along with an amount field 50b for the amount of funds stored therein. The central server 28 may maintain a processor ledger 52 of all of the incoming and outgoing payment transactions from the originator node 30 and recipient node 32 to settle the transactions based on the defined conditions therefor. By way of example, each entry in the ledger may have a transaction identifier 54a, a sender identifier 54b that identifies the originator node 30 that provides the nano-transaction payment, an amount 54c, and a receiver identifier 54d that identifies the recipient node 32 of the funds in the event of the conditions for so transferring the payment are satisfied. This processor ledger 52 may be separate and independent of the cryptocurrency platform ledger and may be stored in a local financial transaction database 44.

In addition to the account 38 and the payment accounts 42, the recipient node 32 (and in some cases, the originator node 30 may have a contact list 56 associated therewith. The contact list 56 may be linked to the specific account 38 with an account identifier field 56a when stored on a contacts database 58 of the central server 28. It will be appreciated that a contact list as maintained on the mobile device 12, for example, is a listing of contacts 60a-c defined by name, phone number, e-mail, physical address, and so forth, and upon being stored on the contacts database 58, such contacts 60 are associated with the account 38. Referring to the block diagram of FIG. 2, this step may be performed by a contacts retriever 62, which connects to the mobile device 12, copies over the contacts data to the contacts database 58, and generates the association, e.g., records the account identifier field 56a for the recipient account 38b. The permission to perform this action may be granted by the user at the time of registration, or some other time before the aforementioned blind filter of the incoming calls may be applied.

Having considered the exemplary data structures and specific databases for storing the various data elements, the overall process as performed by the central server 28 together with the way in which the data is used will now be considered. It will be appreciated that the data structures and segregation of data into the aforementioned databases is presented by way of example only and not of limitation. Any other suitable database structure, including the specific fields utilized, may be substituted.

Figure 4A:
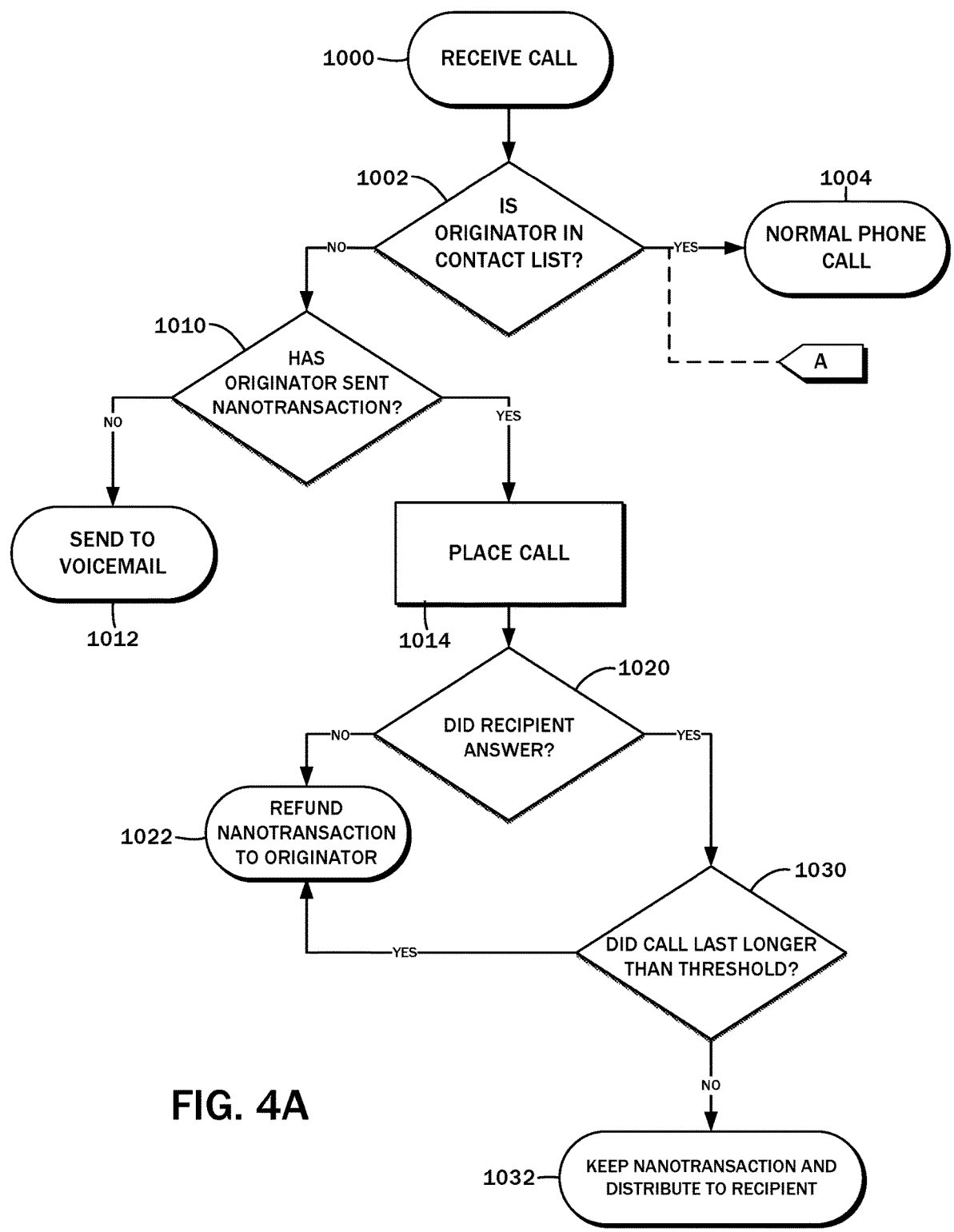
FIGS. 4A and 4B are flowcharts of one contemplated method for selectively connecting a call with a time-based refundable nano-transaction system.

Referring to the flowchart of FIG. 4A, the process begins with a step 1000 of receiving a call from the originator node 30. In a decision block 1002, it is determined whether the calling originator node 30 is in the contact list 56 of the designated recipient node 32. With additional reference to the block diagram of FIG. 2, this evaluation may be performed by the transaction processor 34. The call may be initiated by an automated dialer computer system 64, which has a listing 66 of telephone numbers to dial. In addition to sequentially dialing the designated telephone numbers and connecting the operators of the telephone bank 16, the automated dialer computer system 64 directs an unlocker 68 to communicate certain information to an unlock interface 70 of the central server 28. Specifically, the unlocker 68 transmits an identification of the intended recipient for a nano-transaction payment in the form of the account identifier 40a of the recipient account 38b or the payment account identifier 46a of the recipient payment account 42b together with a payment amount 72. This submission may be referred to as a refundable nano-transaction payment submission 74. Though not shown, an identification of the originator may also be part of the refundable nano-transaction payment submission, including the account identifier 40a of the originator account 38a or the payment account identifier 46a of the originator payment account 42a.

If the originator node 30 is, indeed in the contact list 56, then the call is allowed to proceed normally in accordance with a step 1004. Otherwise, the process continues to a decision block 1010 to determine whether the originator node 30 has sent a refundable nano-transaction payment submission 74 to the central server 28. In one exemplary embodiment, the amount for each communications request is $0.05, though this can be modified. Furthermore, the amount may be dynamically adjusted based on certain background conditions such as time of day, season, day of week, weather, and so on, when it is more or less likely that the call with be received favorably. Moreover, the amount may be pre-negotiated between the originator node 30 and the recipient node 32, or negotiated contemporaneously with the initiation of the call. The account 38 may be used to store information pertaining to the interests of the user 14, and a higher amount may be demanded because of the improved targeting of potential customers for the telemarketing campaign. For example, if the user 14a indicates that he/she enjoys football, then an organization 14b marketing products targeted to a football fan may be willing to pay a higher deposit for the opportunity to market to such individual. The transaction processor 34 is understood to reject all incoming communications for originator nodes 30 with an unknown telephone number or associated with an unknown account, that is, not in the contact list 56. The refundable nano-transaction payment submission therefore serves as a bypass to this blind filter.

The contact list 56 is the basis of the first screening of the incoming calls and is thus a type of whitelist. The whitelist can be extended globally, or individual contact lists 56 may import global whitelists of numbers that are associated with emergency services or other high-priority services that would be important to be immediately connected without nano-payment transactions and the like.

If in the decision block 1010 it is evaluated that the refundable nano-transaction payment submission 74 has not been made, the call is sent to voicemail according to a step 1012. In one embodiment, the system 11 may be implemented at the telecommunications network level so the transaction processor 34 may directly connect the incoming telephone call to the mobile device 12 or reject the call and pass the same to voicemail. The user 14a need not receive any indication of the attempted call.

The transaction processor 34 may interface with a telecommunications switch 76 to handle the incoming call and route the same to the destination node as directed. The telecommunications switch 76 may include an incoming call interface 78 that connects to, for example, the auto-dialing telephone bank 16, as well as an outgoing call interface 80 that connects to the mobile device 12. Generally, the telecommunications switch 76 is understood to establish and disconnect the telecommunications link between the originator node 30 and the recipient node 32. Those having ordinary skill in the art will recognize that the telecommunications switch 76 may be implemented in a variety of different ways, and this disclosure will omit descriptions thereof for the sake of brevity.

The telecommunications switch 76 may report to the transaction processor 34 that there is an incoming call, and this may constitute an incoming telecommunications initiation request. In other embodiments, the incoming telecommunications initiation request may be generated by the automated dialer computer system 64 to the unlocker 68 for transmission to the unlock interface 70 in conjunction with the refundable nano-transaction payment submission 74.

Next, in a decision block 1014, it is evaluated whether the recipient node 32 was answered. If the call was not answered, the nano-transaction payment is refunded to the originator node 30. With the call in progress, the embodiments of the present disclosure contemplate the initiation of a timer 82 that may cooperate with the aforementioned outgoing call interface 80. The timer 82 is stopped when the call with the recipient node 32 is terminated. In a decision block 1030, the duration of the call as measured by the timer 82 is recorded. If the call duration was longer than a predefined threshold, the call is deemed legitimate and the nano-transaction payment is refunded to the originator node 30 per step 1022 discussed above. Otherwise, the call is deemed spam, and the nano-transaction payment is distributed to the recipient node 32 in a step 1032. In some embodiments, a part of the payment may also be distributed to the payment account 42 of the central server 28 for maintenance and other costs. According to one implementation, the predefined threshold may be twenty-five (25) seconds, though this is by way of example only and not of limitation.

As described above, if the originator 30 node is in the contact list of the recipient node 32 as evaluated in the decision block 1002, the call may be routed normally in accordance with step 1004. There may be a further alternative to such call routing in circumstances where the recipient node 32 opts in to receiving telemarketing calls that may be of interest. The account 38 of the user 14a may be used to store the opt-in status, along with the psychographics as noted. In exchange for receiving such a call, or for the recipient node 32 to remain engaged on the call for a predetermined duration, he or she may be offered cash, coupons, or other incentives.

Figure 4B:
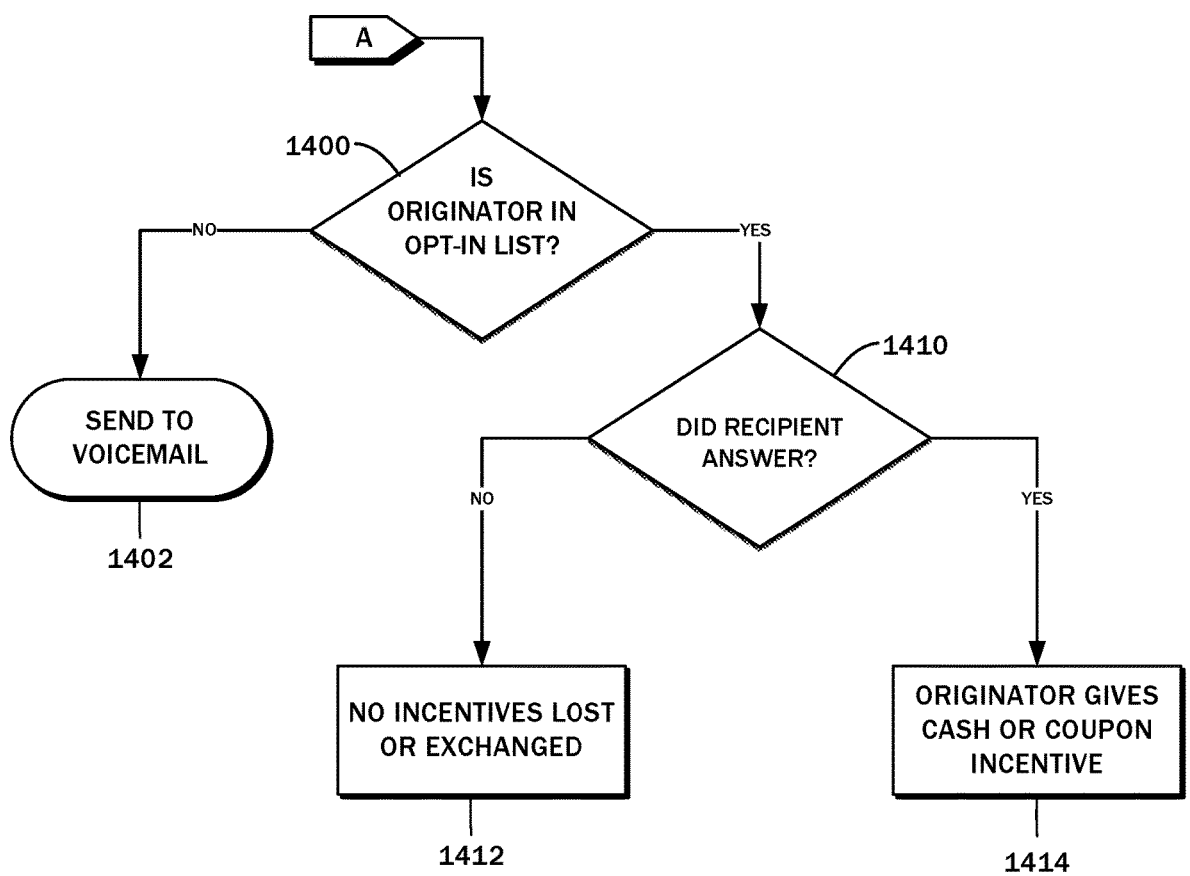

With reference to the flowchart of FIG. 4B, the method may continue with a decision block 1400, in which it is determined whether the originator node 30 is flagged as an entity with which the recipient note 32 has opted in. This evaluation may take place concurrently with the aforementioned decision block 1002 of determining if the originator node 30 is in the contact list of the recipient node 32. In this regard, the contact list 56 may include a separate field for the opt-in status, or there may be a separate opt-in list. If the recipient node 32 has not opted in, the call is transferred to voicemail in accordance with a step 1402. If the recipient node 32 has opted in, then the method proceeds to a decision block 1410 to evaluate whether the call was answered. If there is no answer, then no incentives are lost or exchanged according to a step 1412.

If there is an answer, the originator node 30 provides the recipient node 32 an incentive per step 1414. The amount of the incentive may be varied depending on the duration of the call, completion of a task, and so forth. For example, the recipient node 32 may be paid a predetermined amount per minute spent engaging with the originator node 30, and/or a predetermined amount after making a purchase, completing a survey, providing customer feedback, assisting in market research, etc. This is envisioned to allow entities 14b to target users 14a more effectively, and the users 14b may receive benefits to the extent the entities value such targeted engagement.

Figure 5:
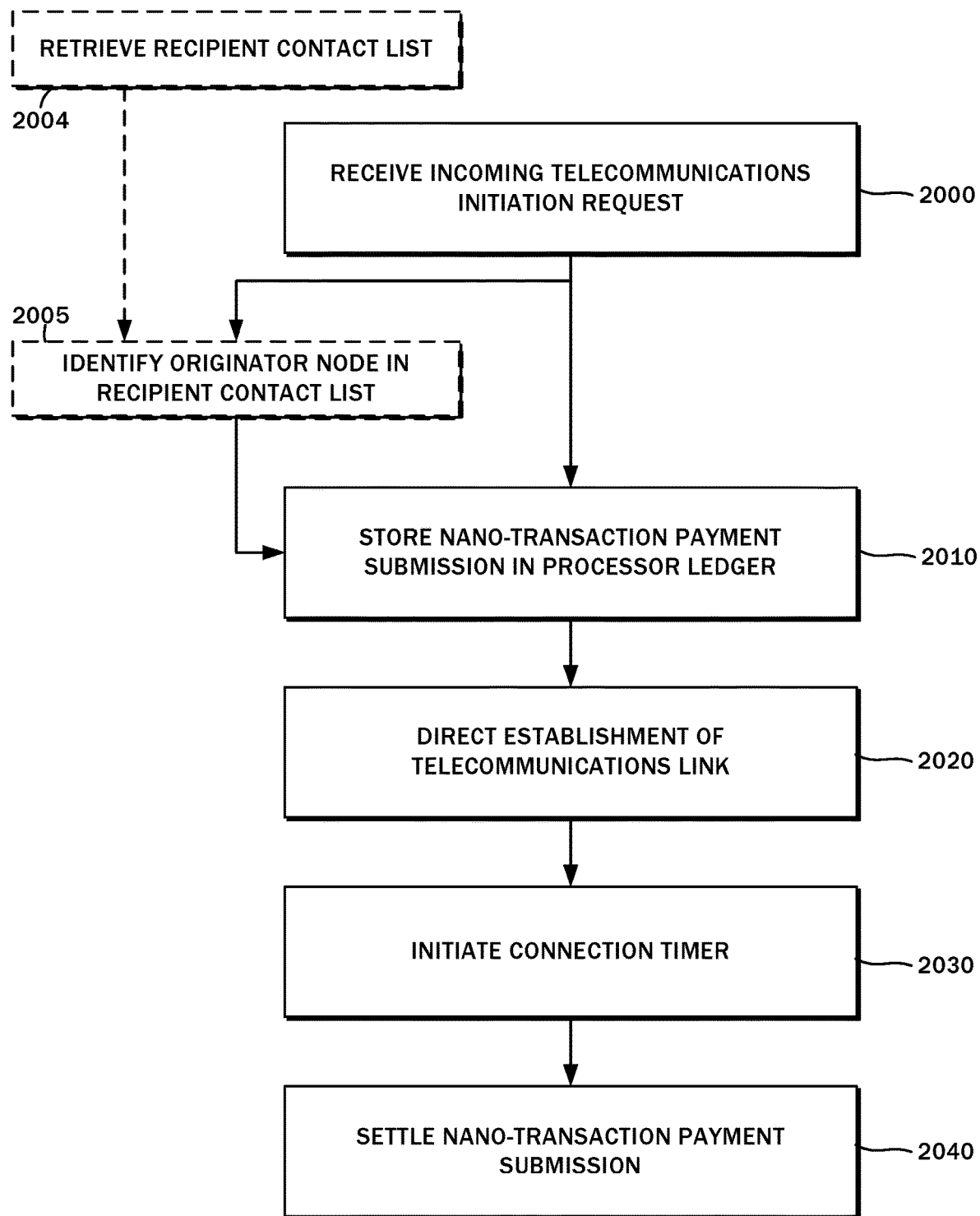
FIG. 5 is a flowchart of a method for selectively connecting an originator node to a recipient node according to one embodiment of the present disclosure.

The flowchart of FIG. 5 provides a more generalized method for selectively connecting the originator node 30 to the recipient node 32 over the telecommunications link. The method begins with a step 2000 of receiving an incoming telecommunications initiation request, which is understood to include the placement of the call as well as the refundable nano-transaction payment submission 74. Again, as described above, the refundable nano-transaction payment submission 74 is defined by at least the account identifier 40a or the payment account identifier 46a of the recipient node 32, though in some embodiments the account identifier 40a or the payment account identifier 46a of the originator node 30 may also be included. In embodiments where, by virtue of making the telecommunications initiation request the originator node 30 is identified, such account information need not be included in the refundable nano-transaction payment submission 74.

Thereafter, in a step 2010, the refundable nano-transaction payment submission 74 is stored in the processor ledger 52. In addition to confirming the nano-transaction payment, there may be a step 2005 of identifying the originator node 30 in the recipient contact list 56. Prior to this evaluation, the method also contemplates a step 2004 of retrieving the recipient contact list 56 from the recipient node 32 as indicated above. Once the nano-payment has been confirmed, the method continues with a step 2020 of directing the establishment of the telecommunications link. This may involve the transaction processor 34 commanding the telecommunications switch 76 to connect the incoming call from the originator node 30 to the recipient node 32. The call may then be answered, at which point a connection timer is initiated according to a step 2030. Once the call is complete, the nano-transaction payment submission is settled in a step 2040. The user 14a also has the option to reject the call in response to the mobile device 12 generating an alert regarding the same (e.g., activating the ringer, and displaying the caller ID). As will be recognized by those having ordinary skill in the art, the call handler system of the mobile device 12 may present a button, a sliding switch, or other user interface element to accept or reject the incoming call. When the call is rejected, the method proceeds along the same lines as though the call was not answered, though this is by way of example only and not of limitation. To further discourage abusive calls, however, in some embodiments it is possible to not refund the entirety of the deposit and retain some portion thereof as a penalty for the brief interruption to the user 14a.

As referenced herein, settling the nano-transaction payment is understood to be the movement of funds from the originator payment account 42a to the recipient payment account 42b or the escrow account 48, as well as back to the originator payment account 42a under certain conditions. The embodiments of the present disclosure contemplate the use of a cryptocurrency payment platform to implement these transactions. Accordingly, settlement may involve the transaction processor 34 submitting the transfer transaction to a distributed ledger of such cryptocurrency payment platform, with the payer and payee account information being tied to the corresponding accounts 38 as maintained on the central server 28.

Although the method describes the settlement taking place as the last step, it is understood that some transactions, for example, the initial nano-transaction payment from the originating node the escrow account 48, the submission to the payment platform distributed ledger may take place at the time it is transmitted from the originator node 30 to the central server 28. The processor ledger 52 referenced above and as maintained in the local financial transaction database 44 is understood to be separate from the distributed ledger of the payment platform in certain embodiments and so settlement in this context may refer to the final settlement of payments to the payment accounts of the originator node 30, the recipient node 32, and/or the central server 28.

Figure 6A:
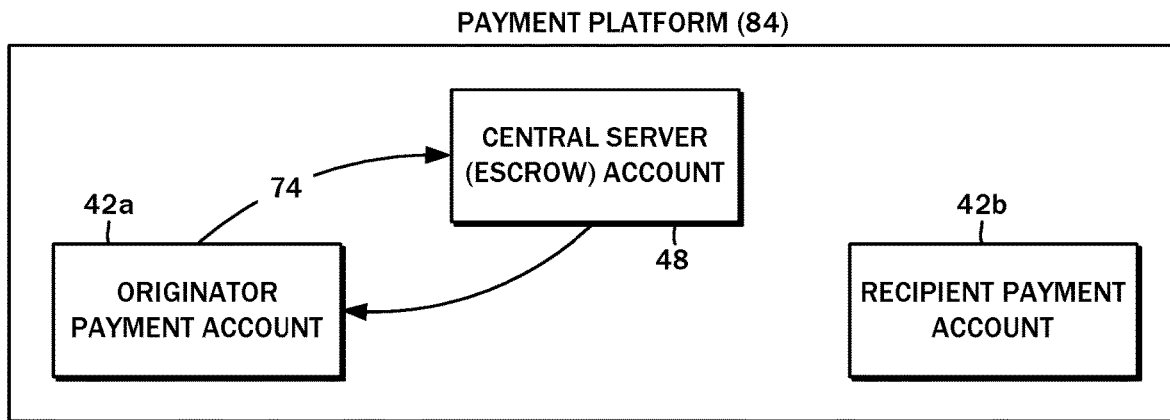
FIGS. 6A and 6B are block diagrams illustrating the movement of funds in accordance with the processes of the present disclosure.

The block diagram of FIG. 6A illustrates the movement of funds within a payment platform 84 when a call is made from the originator node 30 to the recipient node 32. The diagram depicts the originator payment account 42a, a central server or escrow account 48, and the recipient payment account 42b. In order to get past the blind filter where all callers other than those known the recipient node 32 are blocked or sent to voicemail, the originator node 30 makes a refundable nano-transaction payment submission 74. These funds may then be refunded back to the originator payment account 42a when the call is sent to voicemail or otherwise goes unanswered, or when the recipient node 32 answers the call and the duration thereof is greater than a threshold, e.g., twenty-five seconds. It will be appreciated that these refund situations are by way of example only and not of limitation, and there may be other circumstances in which a refund is issued after the refundable nano-transaction payment submission 74.

Figure 6B:
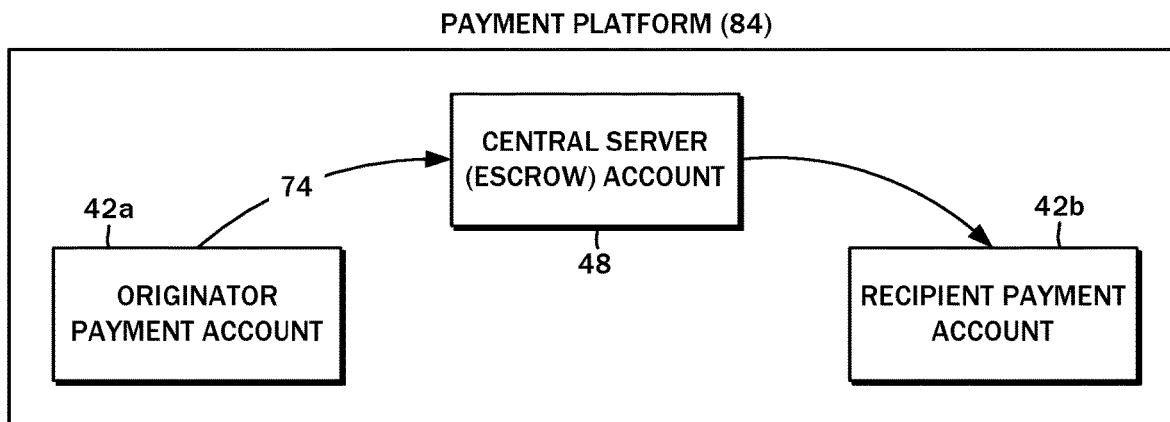

The block diagram of FIG. 6B illustrates another movement of funds within the payment platform 84 when a call is made from the originator node 30 to the recipient node 32. This diagram likewise depicts the originator payment account 42a, the central server or escrow account 48, and the recipient payment account 42b. Again, in order to get past the blind filter where all callers other than those known the recipient node 32 are blocked or sent to voicemail, the originator node 30 makes a refundable nano-transaction payment submission 74. However, the call is answered, and its duration is less than the threshold. This is deemed to be a spam call, and the originator node 30 is penalized by having to forfeit the nano-transaction payment. These funds are instead transferred to the recipient payment account 42b because the recipient node 32 was burdened with having to answer an unwanted call. A portion of these funds may also be retained in the escrow account 48. The split between the recipient payment account 42b and the escrow account 48 may be 80%/20%, though this is for illustrative purposes only, and any other split may be implemented.

Figure 7:
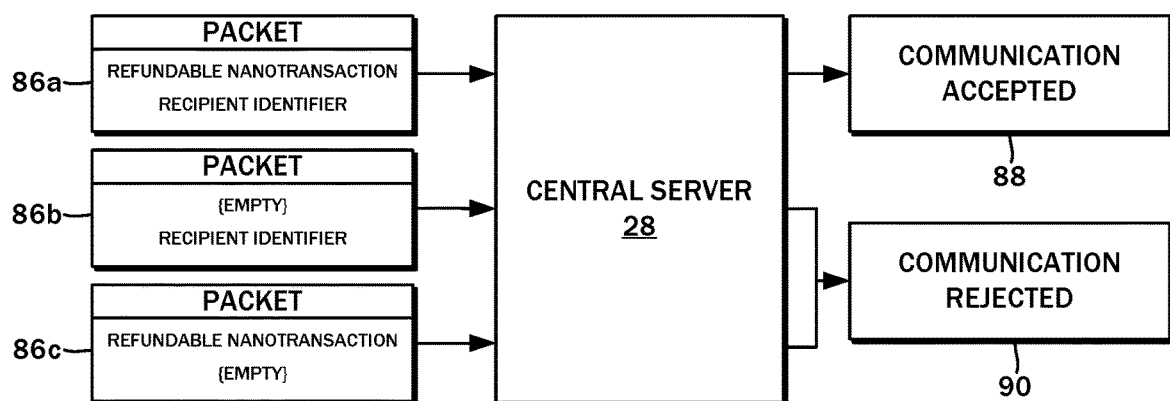
FIG. 7 is a diagram illustrating common scenarios and outcomes in which an unknown originator node attempts to establish a telecommunications link with a recipient node.

In some instances, the telecommunications initiation request may be rejected outright before a call is allowed to be placed to the recipient node 32. FIG. 7 illustrates the different possible requests that may be generated from the originator node 30, depicted as data packets 86a-c, and whether, upon processing by the central server 28, leads to an accepted communication 88 or a rejected communication 90. In other words, the different data packets 86 depend on whether the blind filter can be bypassed or not in order to move on to the next part of the process. The first data packet 86a is where a refundable nano-transaction payment submission 74, as well as the recipient identifier, e.g. the recipient payment account 42b, is specified. When both data elements are provided, the call is placed and hence there is an accepted communication 88. If the unknown originator node 30 provides a second packet 86b in which the refundable nano-transaction payment submission 74 is missing, but the recipient identifier is provided, while the call may be allowed to be placed, the call will be eventually rejected, that is, some period of time following the call being placed and within a typical timespan for the user to see and interact with the mobile device 12 to reject the call. Thus, there may be a rejected communication 90. Likewise, if the unknown originator node 30 provides a third packet 86c in which the refundable nano-transaction payment submission 74 is provided but the recipient identifier is not, the call may be placed, but there is still a rejected communication 90. The rejection can take place at either the telecommunications network level as described above, or on at the recipient node 32 on behalf of the receiving party.

Figure 8:
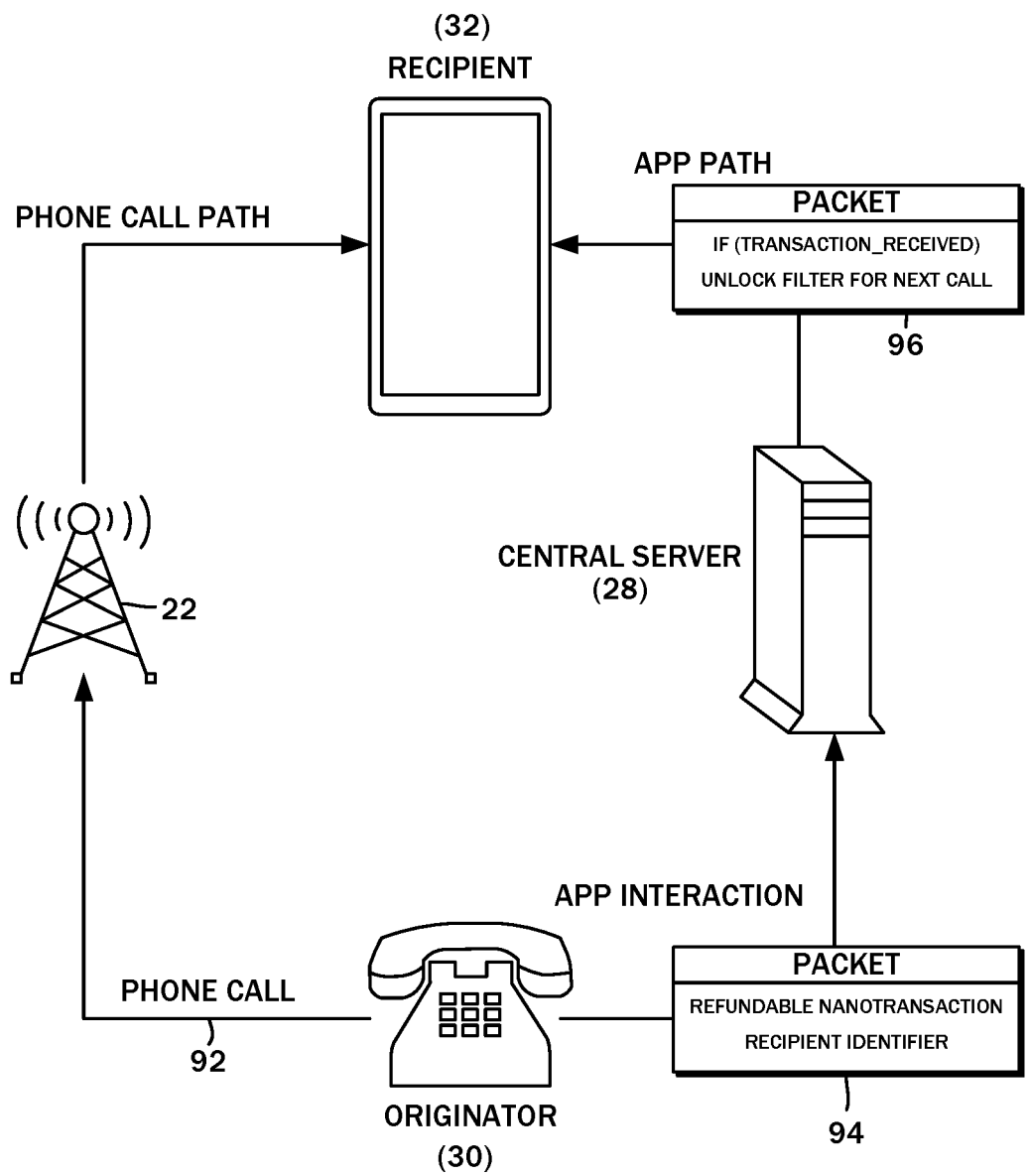
FIG. 8 is a block diagram of an embodiment of the time-based refundable nano-transaction system and the interrelationship between the central server and the telecommunications architecture.

In the various embodiments of the present disclosure, the central server 28 can be integrated with the telecommunications infrastructure 22. That is, the originator node 30 initiates the telephone call and provides the telecommunications initiation request to the central server 28, in which the recipient payment account 42b or the recipient payment account 42b or the recipient account 38b together with the refundable nano-transaction payment submission 74 was transmitted to the transaction processor 34. It is also possible for the central server 28 to operate independently of the telecommunications infrastructure, as shown in the block diagram of FIG. 8. Prior to initiating a phone call 92, the originator node 30 sends a data packet 94 to the central server 28 for processing. The data packet 94, which is understood to generally correspond to the aforementioned telecommunications initiation request, includes the refundable nano-transaction payment submission 74 and the recipient identifier, e.g., the recipient payment account 42b. Upon validating the data packet 94, another data packet 96 can be transmitted to the specified recipient. The data packet 96 may include an instruction to the recipient node 32 to accept the next incoming call. A brief delay may be imposed on the originator node 30 for these processing steps to be completed, so that when phone call placed independently through the telecommunications infrastructure 22, the recipient node 32 automatically, or without further user intervention, allows the call to be accepted.

The recipient node 32 may interact with the central server via mobile device apps, as described in the embodiment above. In addition, the originator node 30 as well as the recipient node 32 may interact with the central server via telecommunications networks, within device architectures, via desktop applications, and internet-enabled applications generally.

In some of the implementations, the recipient node 32 may validate the incoming caller so that the phone call is matched to the correct originator node 30 that provided the nano-transaction payment. Such a variant may be problematic for those originator nodes 30 that wish to remain anonymous, uses call forwarding or virtual numbers. One alternative could be the use of multiple originator node identifiers for each of the possible numbers from which the call could be originating. Instead, one action may be taken to "unlock" the recipient node 32 in accordance with the present disclosure, that is, provide a nano-transaction payment, while in another independent action, the call is placed. This may be referred to as a pinball payment, where the payment is made, then the next incoming call is assumed to be from the paying originator node 30. The pinball payment may also be utilized to pay ahead for a secondary originator node, whereupon the recipient node 32 is unlocked for the next inbound call.

The pinball payment method may be subject to abuse if the central server 28 performs no further validation, where a man-in-the-middle type attack could be used to observe activities on the payment account 42 of the recipient node 32 and knows the phone number associated therewith. Thus, a malicious third party could wait for a legitimate originator node 30 to initiate a nano-transaction and a telecommunications initiation request to the recipient node 32. Upon detection, the malicious third party can immediately call the recipient node 32 in an attempt to fraudulently use the nano-transaction payment for itself. It is therefore preferred, though optional to employ the central server 28 as such type of attacks could be prevented by delaying the public broadcast of the nano-transactions to the recipient node 32 until after the telephone call has been completed.

Figure 9:
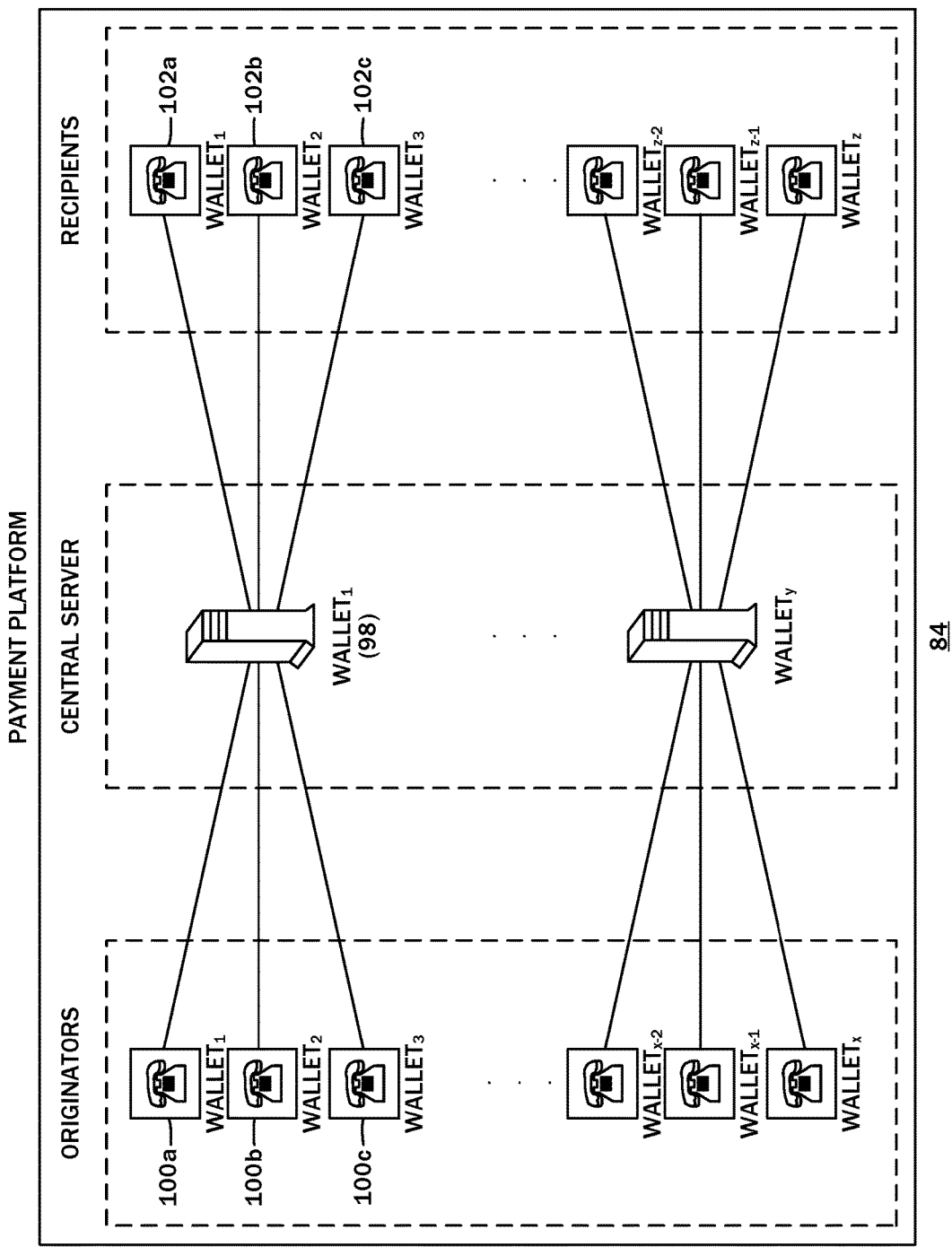
FIG. 9 is a diagram showing the use of multiple wallets to service multiple originator and recipient nodes.

Referring to the diagram of FIG. 9, the payment platform 84 may employ multiple wallets for the originator payment accounts, the recipient payment accounts, and the escrow accounts of the central server 28. For example, a first escrow account wallet 98 may be utilized for nano-transaction payments from a set of three wallets 100a-100c for different originator payment accounts, and a set of three wallets 102a-102c for different recipient payment accounts. This arrangement may be applicable to other multiples of wallets for the originator node 30, the recipient node 32, and the central server 28. This configuration is contemplated to provide a layer of privacy between the originator nodes 30 and the recipient nodes 32, as both will only see transactions from the central server 28 and each is obfuscated from the other. There is also the added benefit of a third-party attacker likewise being unable to see any transactions into the payment accounts of the recipient nodes 32 until after the originator node 30 has completed the communication with the recipient node 32.

As indicated above, embodiments of the present disclosure are not limited to those employing an outside payment platform. The process of deducting and crediting accounts with currency or other form of credit may be implemented on the central server 28. In such embodiments, a central wallet may be used, but is not required. Still further, other embodiments may involve the user directly controlling available funds, in which case an intermediary wallet (e.g., the escrow account 48) may not be needed. Alternatively, several intermediary wallets may be utilized as between the originator node 30 and the recipient node 32.

The system 11 as described above is intended to reduce the volume of unsolicited calls and other real-time telecommunications modalities. Over time, as the presently disclosed system is implemented across more end-user devices, abusive callers and other bad actors will be ignored because they typically do not self-identify and are not listed in the contact list 56 of the recipient nodes 32. In order to continue their abuse of telecommunications systems, bad actors may eventually be forced to comply or act in accordance with the restrictions imposed by the system 11. Then, the higher the volume of unwanted calls are made, the higher nano-transaction losses such bad actors would be forced to absorb. Any improper profits gained through a high-volume telemarketing campaign would be quickly diminished because of such losses. Thus, the present disclosure is contemplated to address the underlying economic incentives and disincentives for continuing to abuse telecommunications systems.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters and configurations described herein are meant to be exemplary and that the actual parameters and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. In the foregoing description, numerous specific details have been provided to provide a thorough understanding of embodiments of the present disclosure. One skilled in the relevant art will recognize, however, that the disclosures may be practiced without one or more of the specific details, or with other methods, components, materials, and so forth. In other instances, well-known structures, materials, or operations are not shown or described in detail to avoid obscuring aspects of the present disclosure.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, all numbers expressing quantities of time, money and the like used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements.

Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the features of the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the present disclosure. Of course, variations on these described embodiments will become apparent to those of ordinary skill in the art upon reading the foregoing description. It is expected that skilled artisans will employ such variations as appropriate, and the it is intended for the present disclosure to be practiced otherwise than specifically described herein. Accordingly, the disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Several references have been made to patents and printed publications throughout this specification. Each of the above-cited references and printed publications are individually incorporated herein by reference in their entirety.

It is to be understood that the embodiments disclosed herein are illustrative of the principles of the invention. Other modifications that may be employed are within the scope of the present disclosure. Thus, by way of example, but not of limitation, alternative configurations of the present disclosure may be utilized in accordance with the teachings herein. Accordingly, the present disclosure is not limited to that precisely as shown and described.

What is claimed is:

1. A telecommunications system for selectively connecting originator nodes to recipient nodes comprising:
    an account database with one or more accounts each associated with corresponding ones of the originator nodes and the recipient nodes;
    a contacts database with recipient contact lists each associated with a specific one of the accounts of the recipient nodes, the recipient contact lists each including one or more known contacts; and
    a transaction processor receptive to an incoming telecommunications initiation request from one of the originator nodes to one of the recipient nodes, the telecommunications initiation request including a recipient node identifier and a refundable nano-transaction payment submission defined at least by a payment amount, the transaction processor responsively directing the establishment of the telecommunications link between the one of the originator nodes and the one of the recipient nodes upon receipt of the telecommunications initiation request and an evaluation of the one of the originator nodes being absent from the recipient contact list in the account associated with the one of the recipient nodes, a legitimacy or illegitimacy of the telecommunications initiation request being evaluated based upon a connection duration as measured by the connection timer, and the refundable nano-transaction payment submission being settled based upon the evaluated legitimacy or illegitimacy of the telecommunications link initiation request without additional user intervention on either the originator node or the recipient node.

2. The telecommunications system of claim 1, further comprising:
    a refundable nano-transaction payment database identifying payment accounts associated with each of the accounts of the corresponding ones of the originator nodes and the recipient nodes, and a processor ledger recording the refundable nano-transaction payment submission for settlement.

3. The telecommunications system of claim 2, wherein the settlement of the refundable nano-transaction payment submission is a transfer of the payment amount from a payment account for the one of the originator nodes to a payment account for the one of the recipient nodes when the active duration of the telecommunications link is shorter than a predefined threshold.

4. The telecommunications system of claim 2, wherein the settlement of the refundable nano-transaction payment submission is a return of the payment amount to a payment account for the one of the originator nodes when the active duration of the telecommunications link is longer than a predefined threshold.

5. The telecommunications system of claim 1, further comprising:
a contacts retriever in communication with the one of the recipient nodes, the recipient contact list being copied from the one of the recipient nodes to the contacts database and associated with the corresponding one of the accounts of the one of the recipient nodes.

6. The telecommunications system of claim 1, further comprising:
a telecommunications switch including an incoming call interface connectible to the one of the originator nodes and an outgoing call interface connectible to the one of the recipient nodes, the telecommunications switch being in communication with the transaction processor to selectively establish the telecommunications link.

7. A method for selectively connecting an originator node to a recipient node over a telecommunications link, the method comprising:
receiving, on a central server, an incoming telecommunications initiation request including a recipient node identifier and a refundable nano-transaction payment submission defined at least by a payment amount;
storing the refundable nano-transaction payment submission in a processor ledger on the central server;
directing the establishment of the telecommunications link from the originator node to the recipient node upon storing the refundable nano-transaction payment submission;
initiating a connection timer once the telecommunications link between the originator node and the recipient node is established;
evaluating a legitimacy or illegitimacy of the telecommunications initiation request based upon a connection duration as measured by the connection timer; and
settling the refundable nano-transaction payment submission based upon the evaluated legitimacy or illegitimacy of the telecommunications link initiation request without additional user intervention on either the originator node or the recipient node.

8. The method of claim 7, further comprising identifying the originator node in a recipient contact list, the storing of the refundable nano-transaction payment submission in the processor ledger being conditioned on an absence of the originator node in the recipient contact list.

9. The method of claim 8, further comprising retrieving the recipient contact list from the recipient node prior to receiving the incoming telecommunications initiation request.

10. The method of claim 7, wherein settling the refundable nano-transaction payment submission includes transferring at least a first portion of the payment amount as defined therein to a recipient payment account corresponding to the recipient node identifier when the telecommunications link initiation request is evaluated as illegitimate.

11. The method of claim 10, wherein the connection duration is below a predefined threshold.

12. The method of claim 10, wherein settling the refundable nano-transaction payment submission further includes transferring at least a second portion of the payment amount as defined therein to a processor payment account associated with the central server.

13. The method of claim 7, wherein settling the refundable nano-transaction payment submission includes returning the entirety of the payment amount to an originator payment account when the telecommunications link initiation request is evaluated as legitimate.

14. The method of claim 13, wherein the connection duration is above a predefined threshold.

15. The method of claim 13, wherein the originator payment account is independent of the originator node, and directing the establishment of the telecommunications link includes commanding the recipient node to accept a subsequent incoming request from the originator node to establish the telecommunications link therewith.

16. The method of claim 7, wherein directing the establishment of the telecommunications link includes relaying the incoming telecommunications initiation request to the recipient node.

17. The method of claim 7 wherein directing the establishment of the telecommunications link includes commanding a telecommunications switch to connect the originator node to the recipient node.

18. An article of manufacture comprising a non-transitory program storage medium readable by a central server data processing apparatus, the medium tangibly embodying one or more programs of instructions executable by the central server data processing apparatus to perform a method of selectively connecting an originator node to a recipient node of a telecommunications link, the method comprising:
receiving, on a central server, an incoming telecommunications initiation including a recipient node identifier and a refundable nano-transaction payment submission defined at least by a payment amount;
storing the refundable nano-transaction payment submission in a processor ledger on the central server;
directing the establishment of the telecommunications link from the originator node to the recipient node upon storing the refundable nano-transaction payment submission;
initiating a connection timer once the telecommunications link between the originator node and the recipient node is established;
evaluating a legitimacy or illegitimacy of the telecommunications initiation request based upon a connection duration as measured by the connection timer; and
settling the refundable nano-transaction payment submission based upon the evaluated legitimacy or illegitimacy of the telecommunications link initiation request without additional user intervention on either the originator node or the recipient node.

19. The article of manufacture of claim 18, wherein the method further includes identifying the originator node in a recipient contact list, the storing of the refundable nano-transaction payment submission in the processor ledger being conditioned on an absence of the originator node in the recipient contact list.

20. The article of manufacture of claim 18, wherein settling the refundable nano-transaction payment submission includes transferring at least a first portion of the payment amount as defined therein to a recipient payment account corresponding to the recipient node identifier.

21. The article of manufacture of claim 18, wherein settling the refundable nano-transaction payment submission includes returning the entirety of the payment amount to an originator payment account.

22. A method for connecting an originator node to a recipient node over a telecommunications link, the method comprising:

receiving, on a central server, an incoming telecommunications initiation request including a recipient node identifier and a refundable nano-transaction payment submission;

storing the refundable nano-transaction payment submission in a processor ledger on the central server;

directing the establishment of the telecommunications link from the originator node to the recipient node based upon an inclusion of the originator node in a recipient opt-in list; and evaluating a legitimacy or illegitimacy of the telecommunications initiation request as a payment condition;

settling the refundable nano-transaction payment submission based upon the payment condition without additional user intervention on either the originator node or the recipient node.

23. The method of claim 22, wherein the payment condition is a duration of the telecommunications link exceeding a predetermined threshold.

24. The method of claim 22, wherein the payment condition is a completion of an action by a user of the recipient node.

* * * * *